(12) United States Patent
Nishimura et al.

(10) Patent No.: US 10,465,684 B2
(45) Date of Patent: Nov. 5, 2019

(54) ROTARY COMPRESSOR

(71) Applicant: DAIKIN INDUSTRIES, LTD., Osaka-shi, Osaka (JP)

(72) Inventors: Kousuke Nishimura, Settsu (JP); Takeyoshi Ohkawa, Sakai (JP); Eiji Kumakura, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 151 days.

(21) Appl. No.: 15/501,301

(22) PCT Filed: Jul. 29, 2015

(86) PCT No.: PCT/JP2015/003824
§ 371 (c)(1),
(2) Date: Feb. 2, 2017

(87) PCT Pub. No.: WO2016/021155
PCT Pub. Date: Feb. 11, 2016

(65) Prior Publication Data
US 2017/0218955 A1 Aug. 3, 2017

(30) Foreign Application Priority Data
Aug. 4, 2014 (JP) .................................. 2014-158696

(51) Int. Cl.
*F16C 29/02* (2006.01)
*F01C 1/324* (2006.01)
(Continued)

(52) U.S. Cl.
CPC .......... *F04C 18/3564* (2013.01); *F01C 21/02* (2013.01); *F01C 21/0809* (2013.01);
(Continued)

(58) Field of Classification Search
CPC ...... F04C 18/3564; F04C 18/32; F04C 2/324; F04C 18/356; F01C 21/0809; F01C 21/02; F01C 1/32; F01C 1/324; F16C 29/02
(Continued)

(56) References Cited

U.S. PATENT DOCUMENTS

2004/0126039 A1* 7/2004 Kashiyama ............. F16C 29/02
384/38

FOREIGN PATENT DOCUMENTS

DE 3816693 A1 * 11/1989 .............. F04C 18/32
JP 3156895 B2 2/2001
(Continued)

OTHER PUBLICATIONS

English Translation of DE3816693 by Espacenet, Aug. 22, 2018.*
(Continued)

*Primary Examiner* — Deming Wan
(74) *Attorney, Agent, or Firm* — Global IP Counselors, LLP

(57) ABSTRACT

A rotary compressor includes a cylinder having a cylinder chamber and bush groove, a piston housed in the cylinder chamber, a blade formed with the piston to separate the cylinder chamber into low and high pressure chambers, and a pair of bushes. The bushes are fitted in the bush groove with flat surfaces facing each other to hold the blade. The flat surface of at least the bush on the low-pressure side has a crowned portion starting from a position closer to the back pressure space than a swing center position, and extending toward an edge of the bush closer to the cylinder chamber. The swing center position is where a gap between the blade and the bush is constant while the piston rotates eccentrically.

5 Claims, 9 Drawing Sheets

(51) Int. Cl.
    *F01C 1/32*         (2006.01)
    *F01C 21/02*       (2006.01)
    *F04C 18/32*       (2006.01)
    *F04C 18/356*     (2006.01)
    *F01C 21/08*       (2006.01)
    *F04C 28/28*       (2006.01)

(52) U.S. Cl.
    CPC .............. *F04C 18/32* (2013.01); *F16C 29/02* (2013.01); *F04C 28/28* (2013.01); *F04C 2240/56* (2013.01)

(58) Field of Classification Search
    USPC ................................ 418/221, 174, 138, 178
    See application file for complete search history.

(56) References Cited

FOREIGN PATENT DOCUMENTS

| | | |
|---|---|---|
| JP | 2005-315112 A | 11/2005 |
| JP | 2009-174355 A | 8/2009 |

OTHER PUBLICATIONS

International Search Report of corresponding PCT Application No. PCT/JP2015/003824 dated Oct. 27, 2015.
European Search Report of corresponding EP Application No. 15 83 0616.7 dated Jan. 31, 2018.
International Preliminary Report of corresponding PCT Application No. PCT/JP2015/003824 dated Feb. 16, 2017.

\* cited by examiner (C=C1+C2+C3+C4)

0 DEGREES

90 DEGREES

270 DEGREES

180 DEGREES

ROTARY COMPRESSOR

CROSS-REFERENCE TO RELATED APPLICATIONS

This U.S. National stage application claims priority under 35 U.S.C. § 119(a) to Japanese Patent Application No. 2014-158696, filed in Japan on Aug. 4, 2014, the entire contents of which are hereby incorporated herein by reference.

TECHNICAL FIELD

The present invention relates to a rotary compressor.

BACKGROUND ART

Rotary compressors having the following elements have been known: a cylinder including a cylinder chamber; a piston accommodated in the cylinder chamber and configured to rotate eccentrically; a blade integrally formed with the piston to separate the cylinder chamber into a low-pressure chamber and a high-pressure chamber; and a pair of bushes which hold the blade in such a manner that allows the blade to swing. In such a rotary compressor, the piston rotates eccentrically and changes the capacities of the low- and high-pressure chambers in the cylinder, thereby compressing the refrigerant (see, e.g., Japanese Patent No. 3155895).

SUMMARY

Technical Problem

With an increasing demand for higher speed and greater capacity of compressors, the inventors of the present application analyzed the behavior of the bushes, which are important components for the sliding properties of the compressor, to find out that the flat surface of the bush on the low-pressure side was not in surface contact with the blade, and that the bush was in a posture which may easily bring the edge of the bush closer to the cylinder chamber into line contact with the blade.

Specifically, the curved surface of the bush on the low-pressure side is pushed toward the cylinder chamber against the inner surface of a bush groove, and the bush rotates in a circumferential direction such that the edge of the bush closer to the back pressure space comes away from the blade, due to the pressure difference between the low pressure in the cylinder chamber and the high pressure in a back pressure space opposed to the cylinder chamber with respect to the bush. Thus, the oil film formed between the edge of the bush closer to the cylinder chamber and the blade becomes small. If the compressor continues to operate in this state, the bush and the blade may wear or seize.

In view of the foregoing background, it is therefore an object of the present invention to provide an improved shape of a bush in order to prevent the edge of the bush closer to the cylinder chamber from coming in line contact with the blade.

Solution to the Problem

An embodiment of the present disclosure is directed to a rotary compressor including: a cylinder (51) having a cylinder chamber (55) in an inner portion thereof and provided with an approximately circular bush groove (63) at a position adjacent to the cylinder chamber (55), a piston (60) housed in the cylinder chamber (55) to rotate eccentrically: a blade (62) integrally formed with the piston (60) to separate the cylinder chamber (55) into a low-pressure chamber (55a) and a high-pressure chamber (55b), and a pair of bushes (61) each having a substantially semicircular shape and including a flat surface (61a), the pair of hushes (61) being fitted in the bush groove (63) such that the flat surfaces (61a) face each other, and the pair of bushes (61) holding the blade (62) placed between the flat surfaces (61a) in such a manner that allows the blade (62) to swing. The present disclosure provides the following solutions.

Specifically, in a first aspect of the present disclosure, a curved surface 61b of at least the bush (61) on a low-pressure side slides with an inner surface of the bush groove (63), while being pushed toward the cylinder chamber (55), due to a pressure difference between a low pressure in the cylinder chamber (55) and a high pressure in a back pressure space (64) opposed to the cylinder chamber (55) with respect to the bush (61). Further, the flat surface (61a) of at least the bush (61) on the low-pressure side is provided with a crowned portion (65) obtained by a crowning process starting from a position which is closer to the back pressure space (64) than a swing center position (O) is, and toward an edge of the at least one bush (61) closer to the cylinder chamber (55). The swing center position (O) is a position where a gap between the blade (62) and the bush (61) is constant while the piston (60) rotates eccentrically.

According to the first aspect of the present disclosure, the flat surface (61a) of at least the bush (61) on the low-pressure side is provided with a crowned portion (65). The crowned portion (65) is a portion obtained through a crowning process starting from a position which is closer to the back pressure space (64) than a swing center position (O) is, and toward the edge of the bush (61) closer to the cylinder chamber (55). The swing center position (O) is a position where a gap between the blade (62) and the bush (61) is constant while the piston (60) rotates eccentrically.

This configuration may prevent the edge of the bush (61) closer to the cylinder chamber (55) from coming in line contact with the blade (62), and may reduce the degree of possibility of wear and seizing between the bush (61) and the blade (62).

Specifically, the edge of the bush (61) closer to the back pressure space (64) rotates in a circumferential direction so as to come away from the blade (62) due to a pressure difference between the low pressure in the cylinder chamber (55) and the high pressure in the back pressure space (64). As a result, the edge of the bush (61) closer to the cylinder chamber (55) rotates so as to come close to the blade (62). In one or more aspects of the present disclosure, the crowned portion (65) is provided at the edge of the bush (61) closer to the cylinder chamber (55). The edge of the bush (61) therefore does not come in contact with the blade (62), allowing a sufficient oil film to be kept between the bush (61) and the blade (62).

A second aspect of the disclosure is an embodiment of the first aspect of the disclosure. In the second aspect, a parameter α, which is a ratio of L' to L (L'/L), is determined to satisfy $$0.2 \le \alpha$$

where L [mm] represents a length of the flat surface (61a) of the bush (61) before being subjected to the crowning process, and L' [mm] represents a length between the edge of the at least, one bush (61) closer to the cylinder chamber (55) and the crowning start position.

According to the second aspect of the present disclosure, there is the swing center position (O) where α is equal to 0.2 (α=0.2). Thus, the parameter α determined so as to satisfy the above condition allows the crowning process to be performed from the swing center position (O) or from a position which is closer to the back pressure space (64) than the swing center position (O) is.

A third aspect of the present disclosure is an embodiment of the first or second aspect of the present, disclosure, in the third aspect, a parameter α, which is a ratio of L' to L (L'/L), is determined to satisfy $$\alpha < 0.5$$

where L [mm] represents a length of the flat surface (61a) of the bush (61) before being subjected to the crowning process, and L' [mm] represents a length between the edge of the at least one bush (61) closer to the cylinder chamber (55) and the crowning start position.

According to the third aspect of the present disclosure, the crowning process satisfying the above condition allows the bushes (61) to hold the blade (62) with reliability. Specifically, if the crowning starts from a position beyond half the length of the flat surface (61a) of the bush (61), the bush (61) may have a too-small sliding area between its flat surface (61a) and the blade (62) and hence increased contact pressure. To prevent such a situation, one or more aspects of the present disclosure determine the crowning start position such that α is less than 0.5 (i.e., α<0.5).

A fourth aspect of the present disclosure is an embodiment of the second or third aspect of the present disclosure. In the fourth aspect, a shift length x [mm], which is a distance from the flat surface (61a) of the bush (61) to a crowning end position, is determined to satisfy $$x \leq \alpha \cdot C$$

where C [mm] represents a total length of gaps between the flat surfaces (610 of the pair of hushes (61) and the blade (62) and gaps between the curved surfaces (61b) and (71b) of the pair of bushes (61) and (71) and the bush groove (63).

According to the fourth aspect of the present disclosure, the crowning process satisfying the above condition may prevent the edge of the bush (61) closer to the cylinder chamber (55) from coming in line contact with the blade (62), and may reduce the degree of possibility of wear and seizing between the bush and the blade.

A fifth aspect of the present disclosure is an embodiment of any one of the first to fourth aspects of the present disclosure. In the fifth aspect, the crowned portion (65) is in a form of an arc in contact with the blade (62) at the crowning start position.

According to the fifth aspect of the present disclosure, the crowned portion (65) is in the form of a smooth curve, specifically, in the form of an arc in contact with the blade (62) at the crowning start position.

A sixth aspect of the present disclosure is an embodiment of any one of the first to fifth aspects of the present disclosure. In the sixth aspect, the flat surface (61a) of each of the bushes (61) is a plane orthogonal to a center line (X) of the bush (61) and parallel to an imaginary plane (70) in contact with the curved surface of the bush (61).

According to the sixth aspect of the present disclosure, the flat surface (61a) of the bush (61) is a plane orthogonal to the center line (X) of the bush (61) and parallel to an imaginary plane (70) in contact with the curved surface of the bush (61).

A seventh aspect of the present disclosure is an embodiment of any one of the first to sixth aspects of the present disclosure. In the seventh aspect, the bush (61) provided with the crowned portion (65) at the edge thereof closer to the cylinder chamber (55) is provided with another crowned portion (65) at an edge thereof closer to the back pressure space (64) so as to be symmetrical about the center line (X) of the bush (61) in plan view.

According to the seventh aspect of the present disclosure, the bush (61) is provided with the crowned portions (65) at the edge closer to the cylinder chamber (55) and the edge closer to the back pressure space (64). The bush (61) is therefore symmetrical about the center line (X) in plan view. This configuration may eliminate the need to check whether the crowned portion (65) is placed closer to the cylinder chamber (55) or to the back pressure space (64) in fitting the bush (61) in the bush groove (63), and therefore the bush (61) may be prevented from being mistakenly assembled.

Advantages of the Invention

One or more embodiments of the present disclosure may prevent the edge of the bush (61) closer to the cylinder chamber (55) from coming in line contact with the blade (62), and may reduce the degree of possibility of wear and seizing between the bush (61) and the blade (62).

DESCRIPTION OF EMBODIMENTS

Embodiments of the present invention will be described based on the drawings. The following embodiments are merely examples in nature, and are not intended to limit the scope, application, or uses of the invention.

First Embodiment

Figure 1:
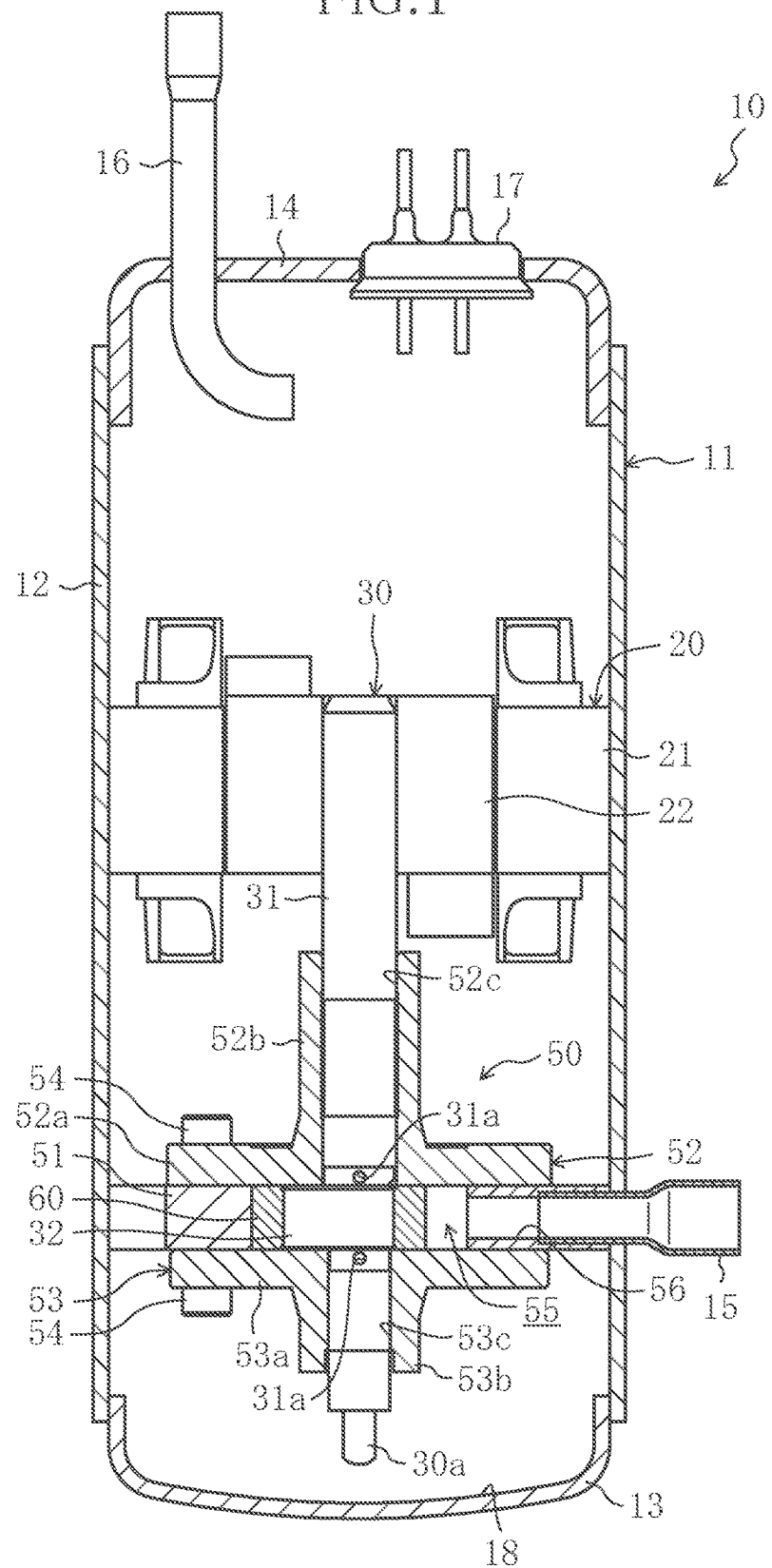
FIG. 1 is vertical cross-sectional view of a configuration of a rotary compressor according to a first embodiment.

As illustrated in FIG. 1, a compressor (10) of the present embodiment is a hermetic rotary compressor. The compressor (10) is connected to a refrigerant circuit (not shown) filled with refrigerant. The refrigerant circuit performs a vapor compression refrigeration cycle. That is, in the refrigerant circuit, the refrigerant compressed by the compressor (10) is condensed by a condenser, depressurized by an expansion valve, and thereafter evaporated in an evaporator to be sucked into the compressor (10).

The compressor (10) has a casing (11), a motor (20) housed in the casing (11), a drive shaft (30) coupled to the motor (20), and a compression mechanism (50) driven by the drive shaft (30).

The casing (11) is configured as a vertically-oriented, hermetic cylindrical container. The casing (11) includes a body (12), a lower end plate (13), and an upper end plate (14). The body (12) is in a vertically-extending cylindrical shape, with both axial, ends closed. The lower end plate (13) is fixed at the lower end of the body (12). The upper end plate (14) is fixed at the upper end of the body (12).

A suction pipe (15) passes through, and is fixed to, a lower portion of the body (12). A discharge pipe (16) passes through, and is fixed to, the upper end plate (14). A terminal (17) for supplying power to the motor (20) is attached to the upper end plate (14).

An oil reservoir (18) is formed at the bottom of the casing (11). The oil reservoir (18) is defined by the lower end plate (13) and the inner wall of the lower portion of the body (12). Lubricating oil (or refrigeration oil) for lubricating sliding portions of the compression mechanism (50) and the drive shaft (30) is accumulated in the oil reservoir (18).

The interior of the casing (11) is filled with high-pressure refrigerant compressed by the compression mechanism (50). That is, the compressor (10) is configured as a high-pressure dome in which the internal pressure of the casing (11) is substantially equal to the pressure of the high-pressure refrigerant.

The motor (20) is located above the compression mechanism (50). The motor (20) includes a stator (21) and a rotor (22). The stator (21) is fixed to an inner circumferential surface of the body (12) of the casing (11). The rotor (22) passes through the inner space of the stator (21) in a vertical direction. The drive shaft (30) is fixed to the interior of the rotor (22) along the central axis of the rotor (22). When the motor (20) is energized, the rotor (22) and the drive shaft (30) are driven to rotate.

The drive shaft (30) is positioned along the central axis of the body (12) of the casing (11). An oil feed pump (30a) is attached to the lower end of the drive shaft (30). The oil feed pump (30a) transfers the lubricating oil accumulated in the oil reservoir (18). The transferred lubricating oil is fed to the sliding portions of the compression mechanism (50) and the drive shaft (30) through an oil path (not shown) in the drive shaft (30) and an oil feed bole (31 a).

The drive shaft (30) includes a main shaft (31) and an eccentric portion (32) that is eccentric from the center of rotation of the main shaft (31). The main shaft (31) is fixed, at its upper portion, to the rotor (22) of the motor (20). The center of the eccentric portion (32) is eccentric from the center of the main shaft (31) by a predetermined amount.

A portion of the main shaft (31) above the eccentric portion (32) is rotatably supported by a front through hole (52c) in a front head (52) which will be described later. A portion of the main shaft (31) below the eccentric portion (32) is located in, and rotatably supported by, a rear through hole (53c) in the rear head (53).

Figure 2:
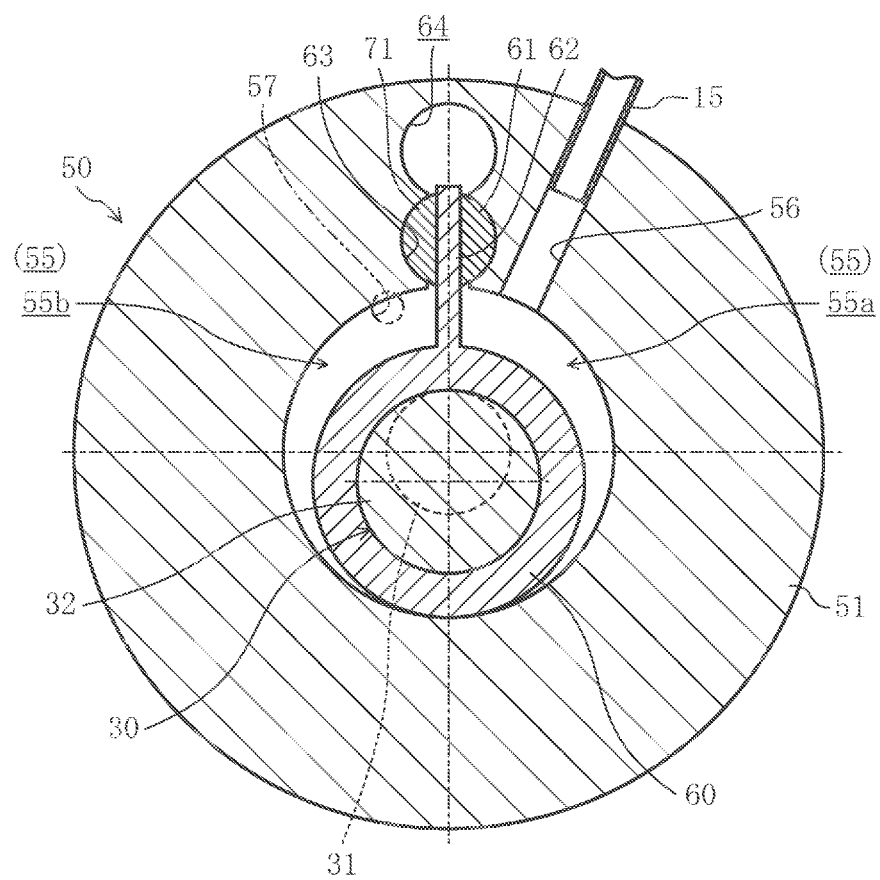
FIG. 2 is a horizontal cross-sectional view of a configuration of a compression mechanism.

As illustrated in FIGS. 1 and 2, the compression mechanism (50) includes a cylinder (51) and the front and rear heads (52) and (53) as head members. The cylinder (51), the front head (52), and the rear head (53) are assembled together with a fastening member (54).

The cylinder (51) is a cylindrical member covering the outer periphery of the eccentric portion (32), and is fixed to the inner circumferential surface of the lower portion of the body (12) of the casing (11). The cylinder (51) is in the form of a flat, approximately annular shape, with a circular cylinder chamber (55) formed in the center thereof. The cylinder (51) is provided with a radially-extending suction port (56). The suction port (56) has an outflow end which communicates with, a low-pressure chamber (55a) of the cylinder chamber (55), and an inflow end to which the suction pipe (15) is connected.

The front head (52) is placed on the upper end of the cylinder (51) so as to cover the internal space of the cylinder (51) from above. The front head (52) is comprised of a flat annular plate (52a) placed on the cylinder (51) and a tubular projection (52b) projecting upward from a radially central portion of the annular plate (52a).

The front head (52) is provided with a discharge port (57) which passes through the annular plate (52a) in an axial direction. The discharge port (57) has an inflow end which communicates with a high-pressure chamber (55b) of the cylinder chamber (55). The discharge port (57) has an outflow end at which a reed valve (not shown) is provided. The annular plate (52a) and the tubular projection (52b) have the front through hole (52c) at the central portion thereof. The main shaft (31) passes through the front through hole (52c).

The rear head (53) is placed on the lower end of the cylinder (51) so as to cover the internal space of the cylinder (51) from below. The rear head (53) is comprised of a flat annular plate (53a) placed on the cylinder (51) and a tubular projection (53b) projecting downward from a radially central portion of the annular plate (53a). The annular plate (52a) and the tubular projection (52b) have the rear through hole (53c) at the central portion thereof. The main shaft (31) passes through the rear through hole (53c).

The compression mechanism (50) further includes a piston (60), a pair of bushes (61), and a blade (62). The piston (60) is housed in the interior of the cylinder (51), i.e., in the cylinder chamber (55). The piston (60) is in the form of a perfect-circular cylindrical shape. The eccentric portion (32) is internally fitted into the internal space of the piston (60).

The cylinder (51) is provided with an approximately circular hush groove (63) at a position adjacent to the cylinder chamber (55). A pair of bushes (61, 71), each in the form of a semicircular shape, are fitted in the bush groove (63). The pair of bushes (61, 71) have flat surfaces (61a, 71a), respectively, and are placed in the bush groove (63) such that the flat surfaces (61a, 71a) face each other. The pair of bushes (61, 71) are configured to swing about the center of the bush groove (63). The bush (61) on the low-pressure side, i.e., on the right side in FIG. 2, has a crowned portion (65) which will be described later.

Figure 3:
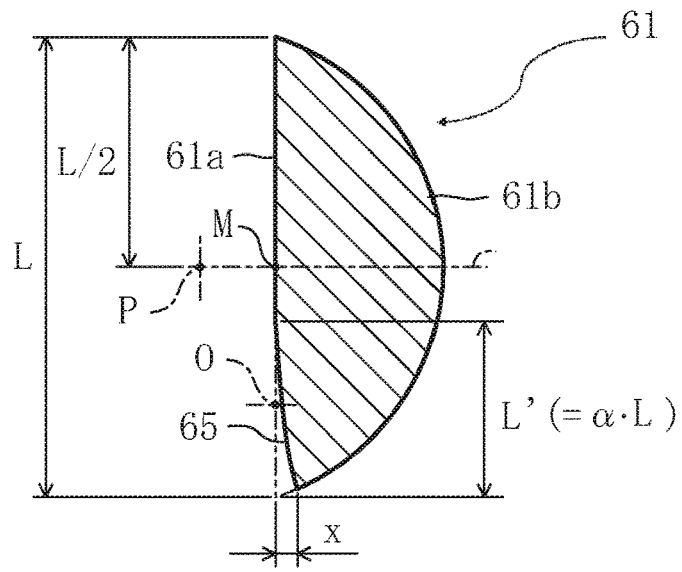
FIG. 3 is a plan view of a configuration of a bush.
Figure 4:
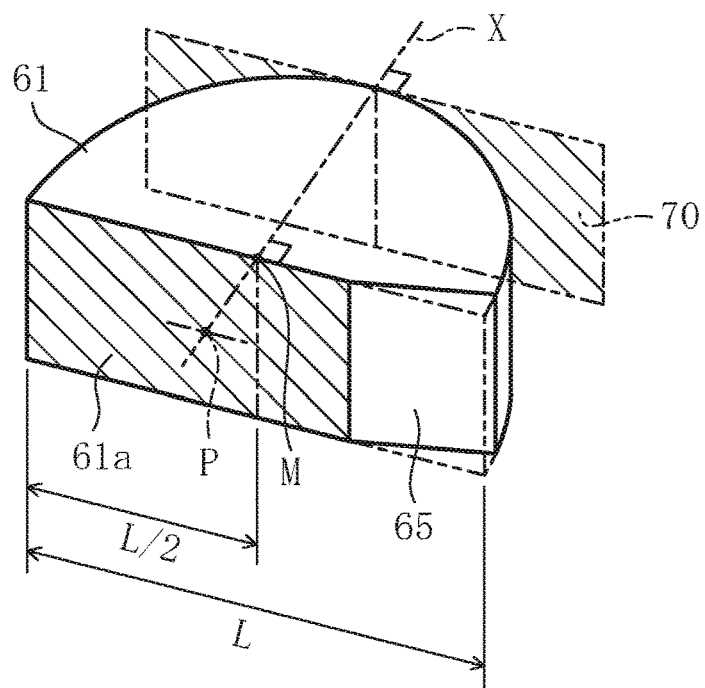
FIG. 4 is a perspective view of the configuration of the bush.

The flat surface (61a) of the bush (61) is a plane orthogonal to a center line (X) of the bush (61) and parallel to an imaginary plane (70) in contact with the curved surface (61b) of the bush (61) (see FIG. 4). The center line (X) of the bush (61) is a straight line passing through a center of curvature (P) of the curved surface (61b) of the bush (61) and a midpoint (M) of the length L of the flat surface (61a) of the bush (61) before being subjected to a crowning process (see FIGS. 3 and 4).

The cylinder (51) is provided with the back pressure space (64) in an approximately circular shape at a position adjacent to the bush groove (63) to prevent interference with the distal end of the blade (62). The lubricating oil transferred by the oil feed pump (30a) is fed, and hence an oil film is formed, between the flat surface (61a) of the bush (61) and the blade (62) and between the curved surface (61b) of the bush (61) and the bush groove (63).

The blade (62) is in the form of a plate extending radially outward. The proximal end of the blade (62) is coupled integrally with an outer periphery of the piston (60). The blade (62) is held between the pair of bushes (61, 71) such that the blade (62) is movable in a fore and aft direction.

The blade (62) separates the cylinder chamber (55) into the low-pressure chamber (55a) and the high-pressure chamber (55b). The low-pressure chamber (55a) is the space on the right, side of the blade (62) in FIG. 2, and communicates with the suction port (56). The high-pressure chamber (55b) is the space on the left side of the blade (62) in FIG. 2, and communicates with the discharge port (57).

The inventors of the present application analyzed the behavior of the bush (61) during operation of the rotary compressor to find out that the flat surface (61a) of the bush (61) on the low-pressure side was not in surface contact with the blade (62), and that the bush (61) was in a posture which may easily bring the edge of the bush (61) closer to the cylinder chamber (55) into line contact with the blade (62).

Specifically, the curved surface (61b) of the bush (61) on the low-pressure side slides with the inner surface of the bush groove (63), while being pushed toward the cylinder chamber (55), and the bush (61) rotates in the circumferential direction such that the edge of the bush (61) closer to the back pressure space (64) comes away from the blade (62), due to the pressure difference between the low pressure in the cylinder chamber (55) and the high pressure in the back pressure space (64) opposed to the cylinder chamber (55) with respect to the bush (61). As a result, the oil film formed between the edge of the bush (61) closer to the cylinder chamber (55) and the blade (62) becomes small. If the compressor continues to operate in this state, the bush (61) and the blade (62) may wear or seize.

Figure 5:
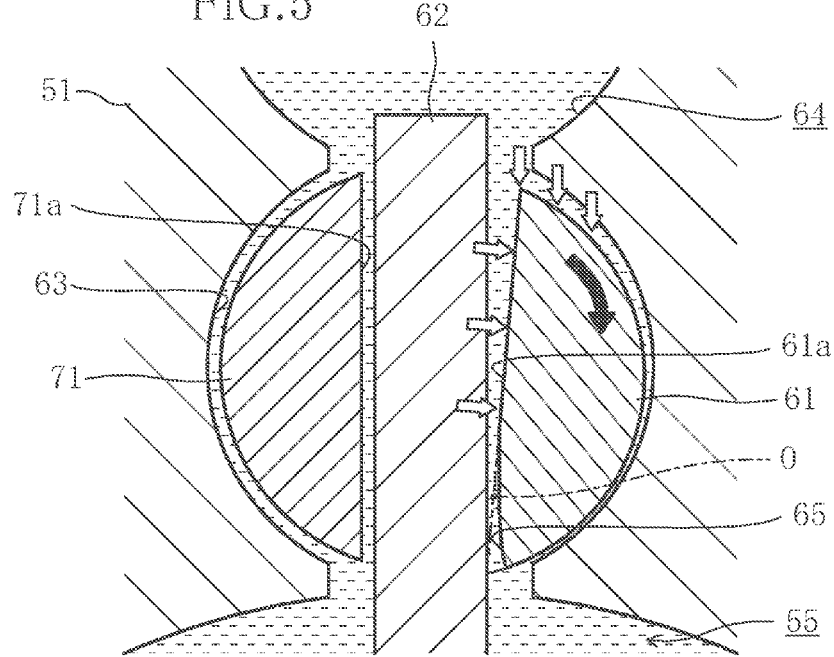
FIG. 5 is a diagram illustrating the bush tilted due to a pressure difference.

To address the problem, in the present embodiment, the crowned portion (65) is formed at the edge of the bush (61) closer to the cylinder chamber (55) by performing a crowning process on the flat surface (61a) of the bush (61) as illustrated in FIGS. 3 to 5. This structure allows sufficient oil film to be kept between the edge of the bush (61) closer to the cylinder chamber (55) and the blade (62), even if the curved surface (61b) of the bush (61) slides with the inner surface of the bush groove (63), while being pushed toward the cylinder chamber (55), as indicated by the white arrows in FIG. 5, and the bush (61) rotates in the circumferential direction such that edge of the bush (61) closer to the back pressure space (64) comes away from the blade (62) as indicated by the black arrow in FIG. 5, due to the pressure difference. How to determine a crowning start position and a crowning end position of the crowned portion (65) will be described below.

Specifically, a parameter α, which is a ratio of L' to L (i.e., L'/L), is determined to satisfy the expression (1) shown below, where L [mm] represents the length of the flat surface (61a) of the bush (61) before being subjected to the crowning process, and L' [mm] represents the length between the edge of the bush (61) closer to the cylinder chamber (55) and the crowning start position.

$$0.2 < \alpha < 0.5 \qquad (1)$$

Figure 6:
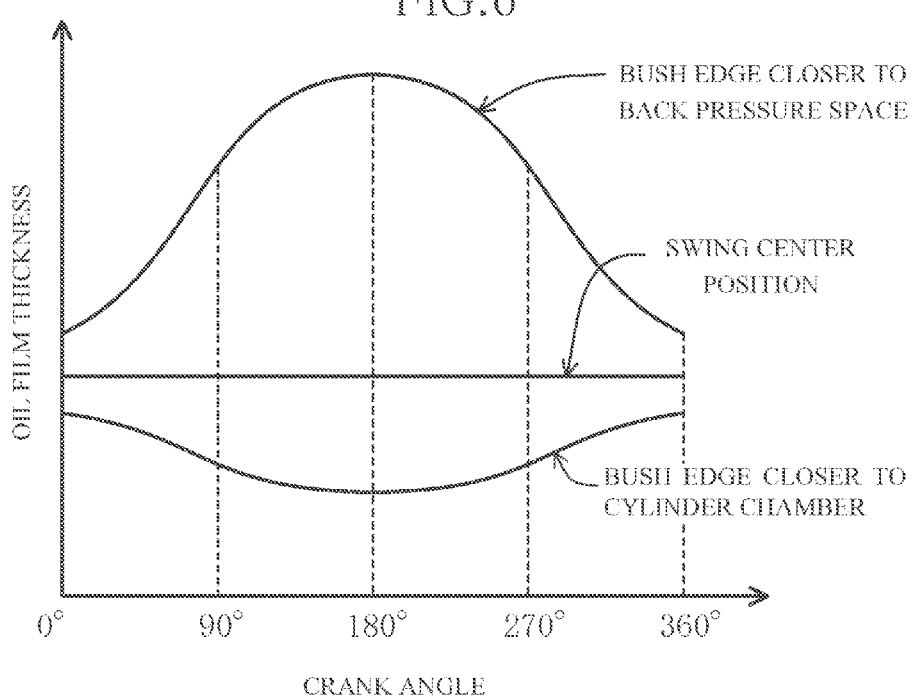
FIG. 6 is a graph showing a relationship between the crank angle of the drive shaft and the thickness of the oil film.

The graph in FIG. 6 shows the relationship between the crank angle of the drive shaft (30) and the thickness of the oil film between the bush (61) and the blade (62). According to the graph, when the crank angle is 180°, the edge of the bush (61) closer to the back pressure space (64) is farthest from the blade (62), and the oil film at that edge has a maximum thickness, whereas the edge of the bush (61) closer to the cylinder chamber (55) is closest to the blade (62), and the oil film at that edge has a minimum thickness.

The graph in FIG. 6 also shows that there is a swing center position (O) in the graph. The swing center position (O) is a position where the thickness of the oil film with respect to the crank angle does not change, that is, a position where the gap between the blade (62) and the bush (61) is constant while the piston (60) rotates eccentrically. The inventors of the present application found out that the swing center position (O) is where α is equal to 0.2 (i.e., α=0.2). Thus, in the present embodiment, α is determined to be greater than 0.2 (0.2<α). In other words, α is determined so that the crowning start position will be closer to the back pressure space (64) than the swing center position (O) is, thereby preventing the edge of the bush (61) closer to the cylinder chamber (55) from coming in line contact with the blade (62).

Specifically, if α is less than 0.2 (i.e., α<0.2), that is, α is determined so that the crowning start position will be closer to the cylinder chamber (55) than the swing center position (O) is, it means that the edge of the bush (61) closer to the cylinder chamber (55) includes a portion which comes closer to the blade (62) than the swing center position (O) does while the piston (60) rotates eccentrically. On the other hand, if the crowned portion (65) is formed such that α is greater than 0.2 (i.e., 0.2<α), the edge of the bush (61) closer to the cylinder chamber (55) does not come closer to the blade (62) than the swing center position (O) does.

This configuration may keep a sufficient oil film between the bush (61) and the blade (62), and may prevent wear and seizing.

Figure 7:
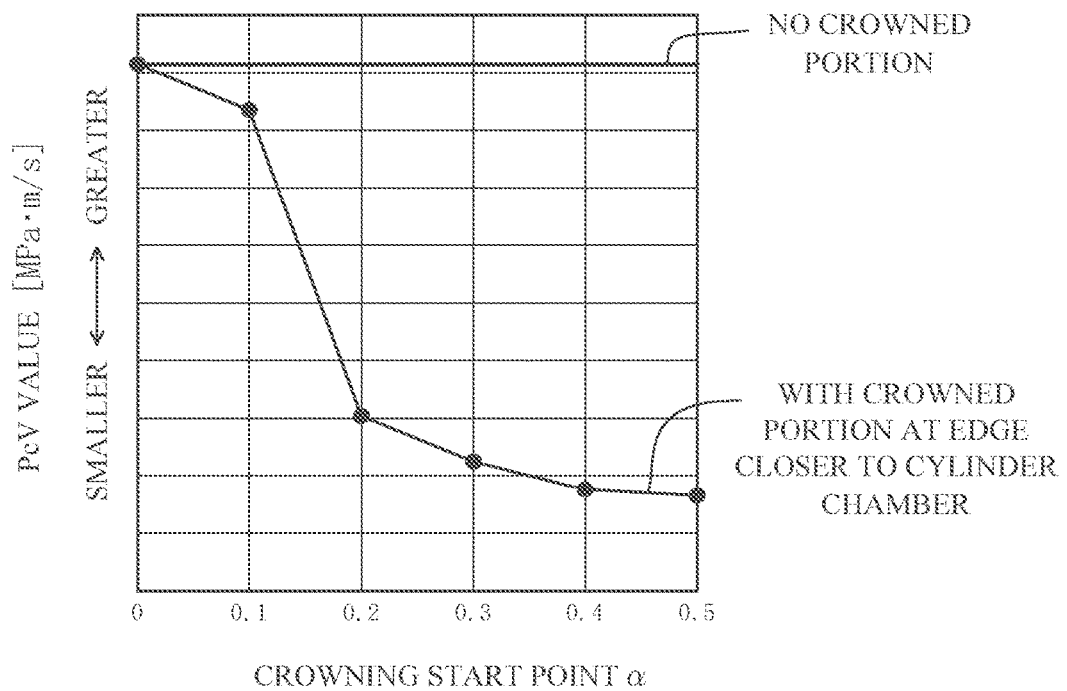
FIG. 7 is a graph showing a relationship between crowning start points and PcV values.

Note that if the crowning starts from a position beyond half the length of the flat surface (61a) of the bush (61), the bush (61) may have a too-small sliding area with the blade (62) and hence increased contact pressure. To prevent such a situation, the present embodiment, determines the crowning start position such that α is less than 0.5 (i.e., α<0.5), FIG. 7 is a graph showing a relationship between crowning start points and PcV values. The PcV values used herein are obtained by multiplying a mean pressure Pc, which is a divided contact load between solid objects, by a relative velocity V. The PcV values indicate the degree of possibility of seizing between the bush (61) and the blade (62) when they slide with each other. A smaller PcV value indicates less possibility of seizing between the bush (61) and the blade (62).

The graph in FIG. 7 shows that the PcV values are smaller when the crowned portion (65) is provided at the edge of the bush (61) closer to cylinder chamber (55), than when the crowned portion (65) is not provided at the bush (61). In other words, the degree of possibility of seizing may be reduced by providing the crowned portion (65) at the edge of the bush (61) closer to the cylinder chamber (55).

Figure 8:
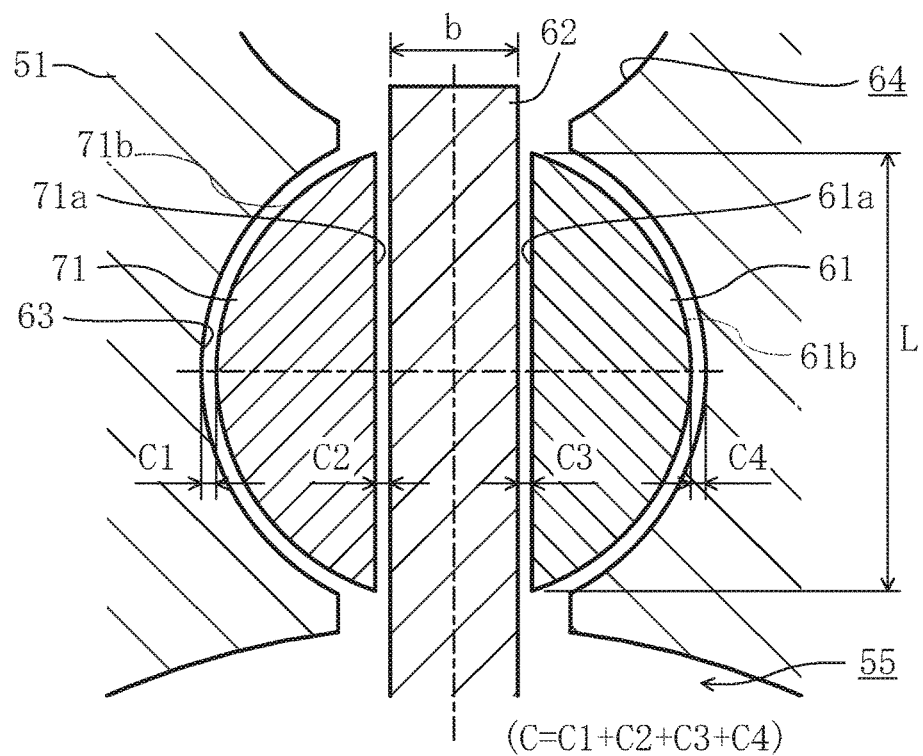
FIG. 8 is a diagram for explaining a method of calculating the shift length from the flat surface of the bush to a crowning end position.

Further, in the present embodiment, the shift length x [mm], which is a distance from the flat surface (61a) of the bush (61) to the crowning end position satisfies the expression (2) shown below, where C represents a total length of the gaps between the flat surfaces (61a) of the pair of bushes (61) and the blade (62) and the gaps between the curved surfaces (61b) and (71b) of the pair of bushes (61) and (71) and the bush groove (63) as illustrated in FIG. 8.

$$x \leq \alpha \cdot C \qquad (2)$$

Figure 9:
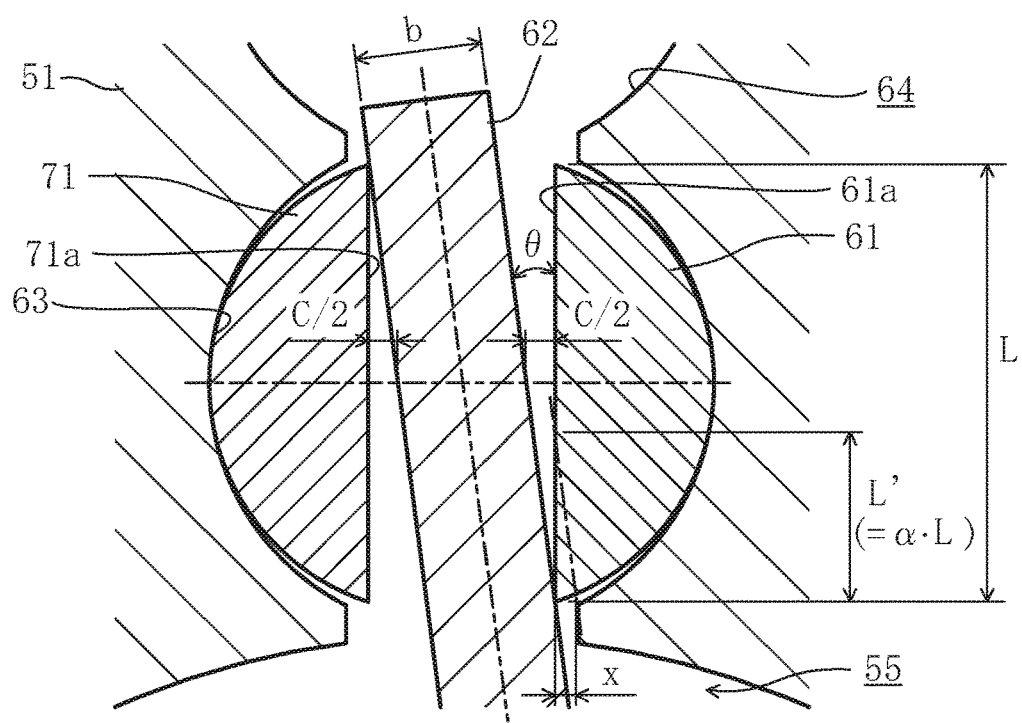
FIG. 9 is a diagram for explaining the maximum tilt angle of the blade.

How to calculate the expression (2) will be specifically described below. As illustrated in FIG. 9, a maximum tilt angle θ [°] of the blade (62) can be obtained based on the geometric relationship among the bush (61), the bush groove (63), and the blade (62), Providing a crowned surface having a tilt angle less than the maximum tilt angle θ may prevent the edge of the bush (61) closer to the cylinder chamber (55) from coming in contact with the blade (62) without increasing the contact pressure.

First, a relationship between a maximum tilt angle θ of the bush (61) on the low-pressure side and the total length C of the gaps will be discussed. In discussing the maximum tilt angle θ of the bush (61), a case in which the blade (62) is in the center position of the bush groove (63) will be considered since the blade (62) always undergoes a pressure difference between the low-pressure chamber (55a) and the high-pressure chamber (55b).

The total length C of the gaps is expressed by $C=C1+C2+C3+C4$ (see FIG. 7). Thus, the following expression (3) is true.

$$b/2 + C/2 = (b/2)\cdot(1/\cos \theta) + (L/2)\cdot\tan \theta \quad (3)$$

The expression (3) can be expressed by the following expression (4).

$$(1-\cos \theta)\cdot b + L\cdot\sin \theta = C\cdot\cos \theta \quad (4)$$

Since the total length C of the gaps of the bush (61) is sufficiently smaller than the length L of the flat surface (61a) of the bush (61), approximating the cos θ to 1 makes the following expression (5) true.

$$\tan \theta = C/L \quad (5)$$

The shift length x from the flat surface (61a) of the bush (61) to the crowning end position can be expressed by the following expression (6).

$$x = \alpha \cdot L \cdot \tan \theta \quad (6)$$

The expression (2) can be obtained by substituting the expression (5) in the expression (6) and determining the resultant value to be an upper limit of the shift, length x.

As can be seen from the foregoing description, the bush (61) is provided with the crowned portion (65) through a crowing process which satisfies the expression (1) (i.e., $0.2<\alpha<0.5$) relating to the crowning start position and the expression (2) (i.e., $x \leq \alpha \cdot C$) relating to the crowning end position. As a result, the crowned portion (65) may prevent the edge of the bush (61) closer to the cylinder chamber (55) from coming in line contact with the blade (62), and therefore may prevent wear and seizing between the bush and the blade.

Preferably, the crowned portion (65) is in the form of an arc in contact with the blade (62) at the crowning start position.

—Operation of Compressor—

Basic operation of the compressor (10) will be described. First, as illustrated in FIG. 1, the motor (20) is actuated by the electric power supplied to the motor (20) from the terminal (17), and the drive shaft (30) is driven to rotate by the motor (20). Then, the eccentric portion (32) of the drive shaft (30) starts to rotate eccentrically, and the piston (60) rotates eccentrically due to this rotation of the eccentric portion (32).

On the other hand, the oil feed pump (30a) draws up the lubricating oil from the oil reservoir (18). The drawn-up lubricating oil is discharged through the oil path in the drive shaft (30) and the oil feed hole (31a), and is fed, for example, to the sliding portion with the main shaft (31) or to the cylinder chamber (55).

FIG. 10 illustrates sequential movements of the piston (60) in the cylinder chamber (55). In the present embodiment, the movements of the piston (60) will be described sequentially from the position illustrated in FIG. 10A as a start position (0 degree angle) where the low-pressure chamber (55a) and the high-pressure chamber (55b) are continuous.

Figure 10A:
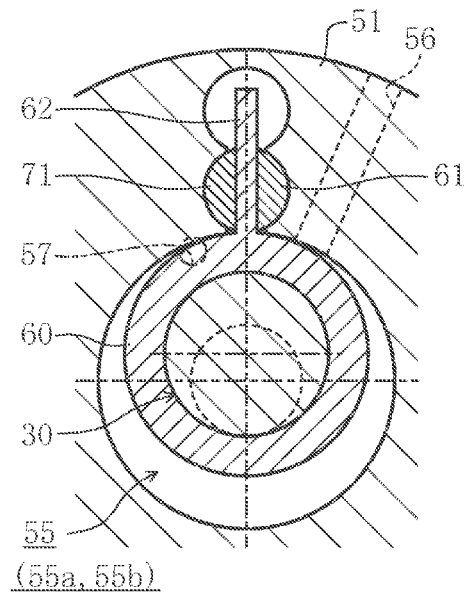
FIGS. 10A to 10D are diagrams illustrating the movement of the piston in the cylinder chamber.
Figure 10B:
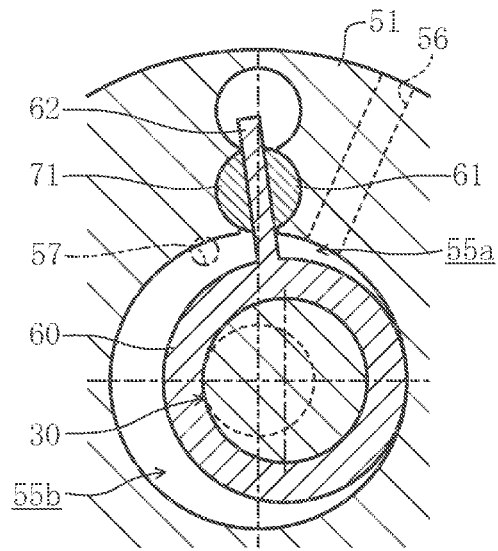
Figure 10D:
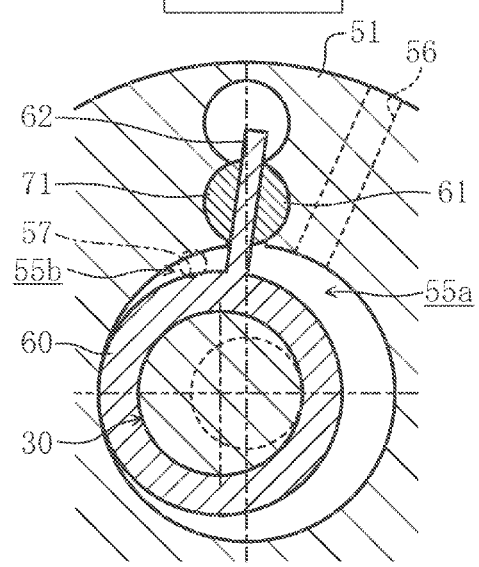
Figure 10C:
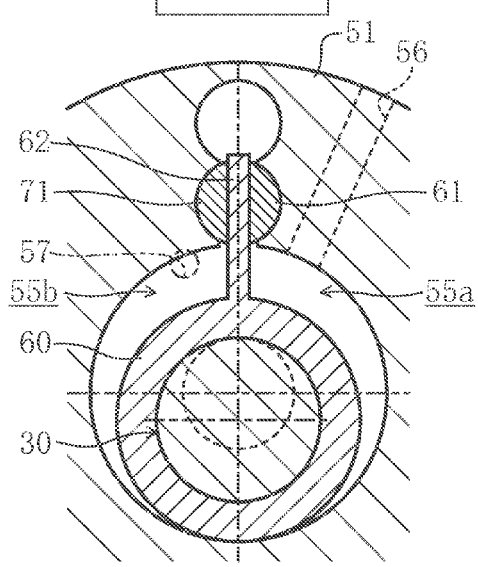

When the motor (20) rotates, the piston (60) revolves in a clockwise direction from the state illustrated in FIG. 10A along the inner circumferential surface of the cylinder chamber (55), and reaches the state illustrated in FIG. 10B, where the internal space of the cylinder chamber (55) is separated into the low-pressure chamber (55a) and the high-pressure chamber (55b) by the blade (62). In this position of the piston (60), refrigerant gas is drawn into the low-pressure chamber (55a) from the suction port (56), Further revolution of the piston (60) from the state in FIG. 10B gradually increases the capacity of the low-pressure chamber (55a) and reduces the capacity of the high-pressure chamber (55b) on the other hand (see FIG. 10C). In other words, during this movement, the refrigerant gas in the high-pressure chamber (55b) is gradually compressed to be in a high-pressure state. When the capacity of the high-pressure chamber (55b) is further reduced and the refrigerant gas has a pressure greater than or equal to a predetermined pressure value (see FIG. 10D), such a pressure opens the reed valve (not shown), allowing the high-pressure refrigerant gas to be discharged into the casing (11) from the high-pressure chamber (55b).

Further revolution of the piston (60) brings the piston (60) back to the state illustrated in FIG. 10A. In this manner, the piston (60) repeats the cycles illustrated in FIGS. 10A to 10D, and the refrigerant gas is compressed accordingly.

Second Embodiment

Figure 11:
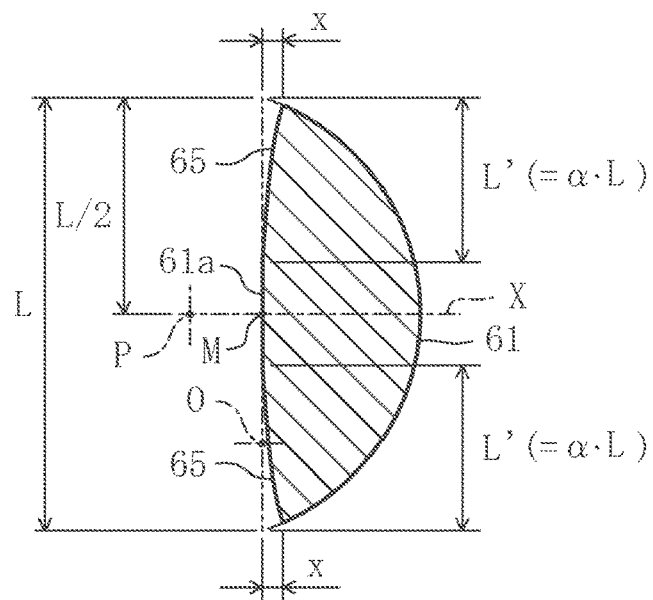
FIG. 11 is a plan view of a configuration of a bush according to a second embodiment.

FIG. 11 is a plan view of a configuration of a bush according to the second embodiment. The same reference characters are used to designate elements identical to those described in the first embodiment, and only differences will be described.

Figure 12:
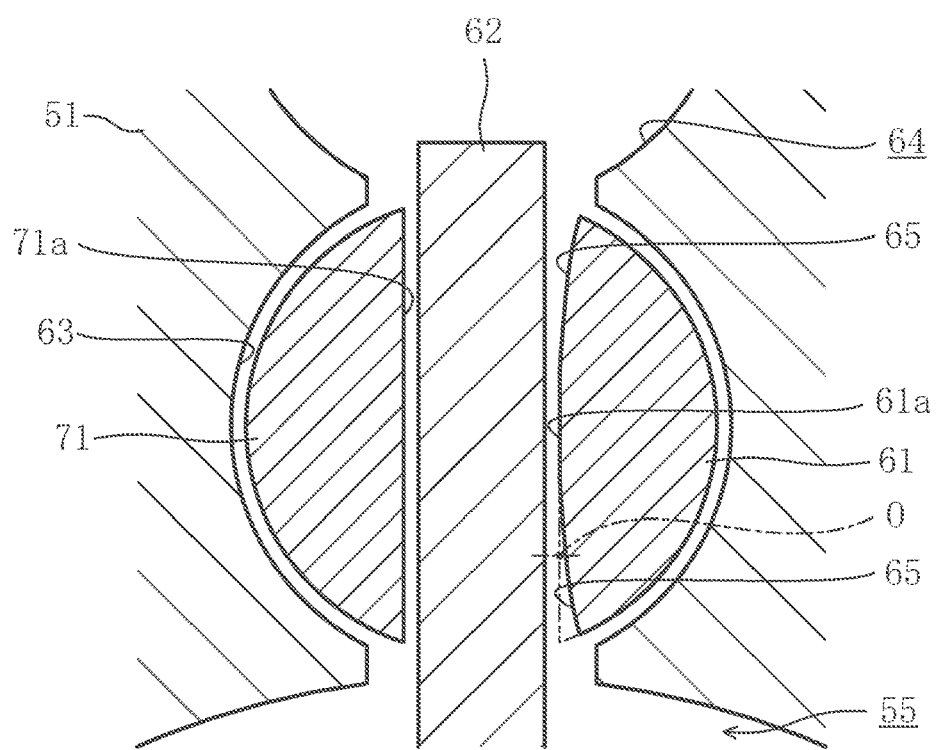
FIG. 12 is a plan view of the bush fitted in a bush groove.

As illustrated in FIGS. 11 and 12, the flat surface (61a) of the bush (61) on the low-pressure side is provided with crowned portions (65) on the edge closer to the cylinder chamber (55) and the edge closer to the back pressure space (64).

The crowned portion (65) closer to the cylinder chamber (55) is formed through a crowning process starting from a position which is closer to the back pressure space (64) than the swing center position (O) is, and toward the edge closer to the cylinder chamber (55). The crowned portion (65) closer to the back pressure space (64) and the crowned portion (65) closer to the cylinder chamber (55) are symmetrical about the center line (X) of the bush (61) in plan view.

In this manner, the bush (61) is symmetrical about the center line (X) in plan view. This configuration may eliminate the need to check whether the crowned portion (65) is placed closer to the cylinder chamber (55) or to the back pressure space (64) in fitting the bush (61) in the bush groove (63), and therefore the bush (61) may be prevented from being mistakenly assembled.

Figure 13:
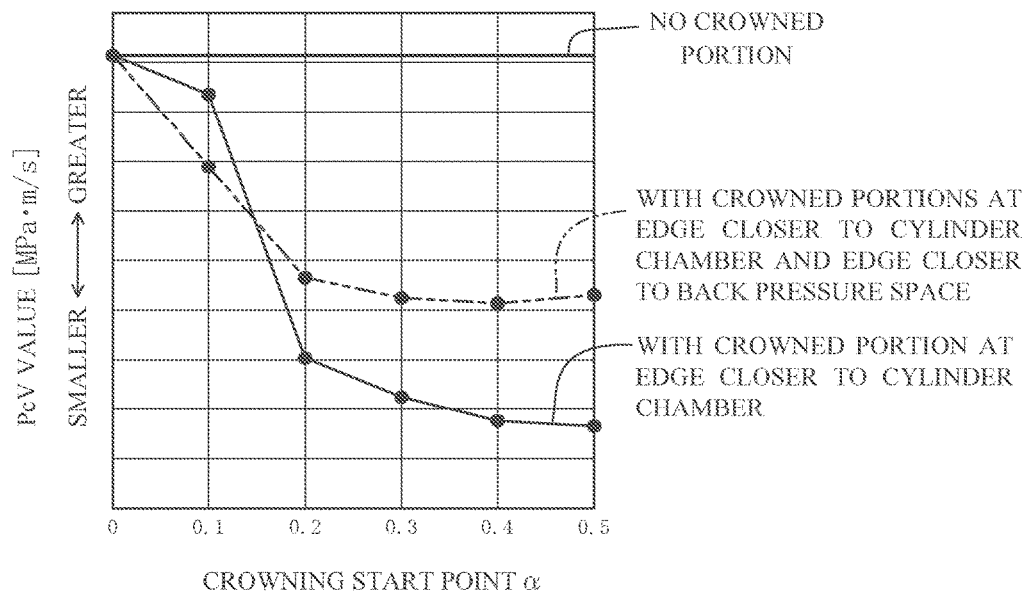
FIG. 13 is a graph showing a relationship between crowning start points and PcV values.

FIG. 13 is a graph showing a relationship between crowning start points and PcV values. The PcV values used herein are obtained by multiplying a mean pressure Pc, which is a divided contact load between solid objects, by a relative velocity V. The PcV values indicate the degree of possibility of seizing between the bush (61) and the blade (62) when they slide with each other. A smaller PcV value indicates less possibility of seizing between the bush (61) and the blade (62).

The graph in FIG. 13 shows that, the PcV values are smaller when the crowned portions (65) are provided at the edge of the bush (61) closer to the cylinder chamber (55) and the edge closer to the back pressure space (64), than when the crowned portion (65) is not provided at the bush (61). In other words, the degree of possibility of seizing may be reduced by providing the crowned portion (65) at the edge of the bush (61) closer to the cylinder chamber (55).

The PcV values tend to be greater when the crowned portions (65) are provided at the edge of the bush (61) closer to the cylinder chamber (55) and the edge closer to the back pressure space (64), than when the crowned portion (65) is provided only at the edge of the bush (61) closer to the cylinder chamber (55).

However, it is preferable to provide the crowned portions (65) at the edges of the bush (61) closer to the cylinder chamber (55) and the back pressure space (64) since such a structure may advantageously prevent the bush (61) from being mistakenly assembled.

Third Embodiment

Figure 14:
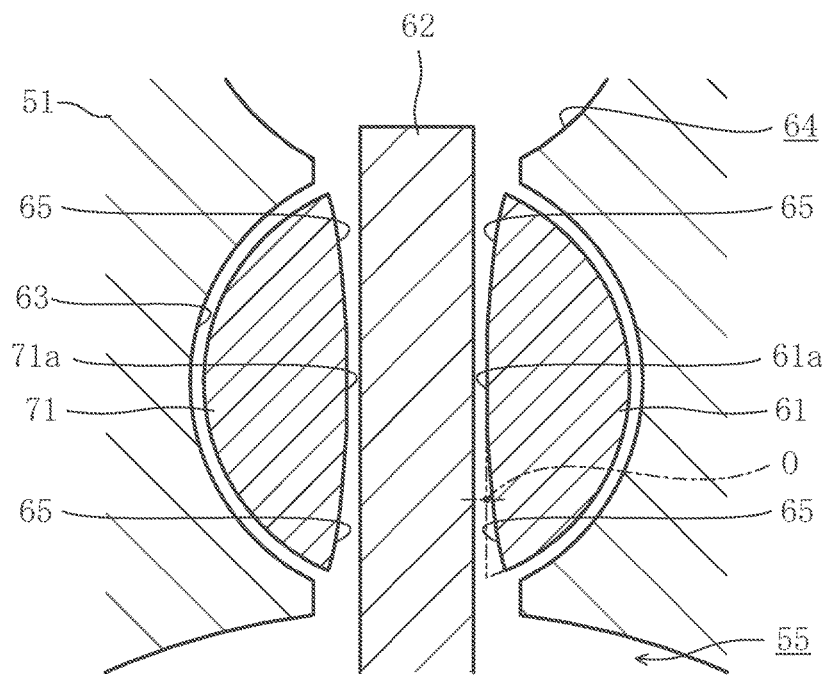
FIG. 14 is a plan view of a bush according to a third embodiment which is fitted in the bush groove.

FIG. 14 is a plan view of a bush according to the third embodiment which is fitted in the bush groove. The same reference characters are used to designate elements identical to those described in the second embodiment, and only differences will be described.

As illustrated in FIG. 14, each of the flat surfaces (61$a$, 71$a$) of the bushes (61, 71) on the low- and high-pressure sides is provided with crowned portions (65) on the edge closer to the cylinder chamber (55) and the edge closer to the back pressure space (64). That is, the bush (61) on the low-pressure side and the bush (71) on the high-pressure side are the same components placed symmetrically about the blade (62).

Using the components having the same shape for the bushes (61, 71) on the low-pressure side and the high-pressure side may prevent complicated control of the components.

Other Embodiments

The above embodiments may also have the following configurations.

In the first embodiment, an example in which the bush (61) on the low-pressure side is subjected to the crowning process on the edge thereof closer to the cylinder chamber (55) has been described. However, the bush (71) on the high-pressure side, too, may be subjected to a crowning process on the edge thereof closer to the cylinder chamber (55). In such a configuration, the pair of bushes (61, 71) may have the same shape, which may prevent complicated control of the components.

In the first embodiment, an example in which $\alpha$ is less than 0.2 (i.e., 0.2<$\alpha$), that is, $\alpha$ is determined such that the crowning start position will be closer to the back pressure space (64) than the swing center position (O) is, has been described. However, $\alpha$ may be equal to 0.2 (i.e., 0.2=$\alpha$), that is, $\alpha$ may be determined such that the swing center position (O) coincides with the crowning start position.

In the second and third embodiments, the bush (61) is provided with the crowned portions (65) having the same shape at the edge closer to the cylinder chamber (55) and the edge closer to the back pressure space (64) so as to be symmetrical about the center line (X) in plan view. However, this is merely a non-limiting example. For example, the bush (61) may be provided with crowned portions (65) in different shapes at the edge closer to the cylinder chamber (55) and the edge closer to the back pressure space (64) so as to be unsymmetrical about the center line (X).

INDUSTRIAL APPLICABILITY

As can be seen from the foregoing description, the present invention provides an improved shape of a bush, and therefore exhibits highly practical advantage that the edge of the bush closer to the cylinder chamber may not be in line contact with the blade. Hence, the present invention is very useful and applicable to the industry.

What is claimed is:

1. A rotary compressor comprising:
a cylinder having a cylinder chamber in an inner portion thereof and provided with an approximately circular bush groove at a position adjacent to the cylinder chamber;
a piston housed in the cylinder chamber and configured to rotate eccentrically;
a blade integrally formed with the piston and separating the cylinder chamber into a low-pressure chamber and a high-pressure chamber; and
a pair of bushes each having a substantially semicircular shape and including a flat surface and a curved surface, the pair of bushes being fitted in the bush groove such that the flat surfaces face each other and the curved surfaces face the bush groove, and the pair of bushes holding the blade placed between the flat surfaces in such a manner that allows the blade to swing,
one of the bushes being disposed on a low pressure side, the curved surface of at least the bush on the low-pressure side sliding with an inner surface of the bush groove while being pushed toward the cylinder chamber due to a pressure difference between a low pressure in the cylinder chamber and a high pressure in a back pressure space opposed to the cylinder chamber with respect to the bush, and
the bush on the low-pressure side being provided with a crowned portion disposed between the flat surface and the curved surface at an edge of the bush closer to the cylinder chamber,
the crowned portion being formed by performing a crowning process from a predetermined crowning start position on the flat surface of the bush to a crowning end position disposed toward the edge of the bush closer to the cylinder chamber, and
a parameter $\alpha$, which is a ratio of L' to L, being determined to satisfy $$0.2 \leq \alpha < 0.5$$

where L represents a length of the flat surface of the bush before being subjected to the crowning process, and L' represents a length between the edge of the at least one bush closer to the cylinder chamber and the predetermined crowning start position.

2. The rotary compressor of claim 1, wherein
a shift length x, which is a distance from the flat surface of the bush to the crowning end position in a direction perpendicular to the flat surface, satisfies $$x \leq \alpha \cdot C$$

where C represents a total length of gaps between the flat surfaces of the pair of bushes and the blade and gaps between the curved surfaces of the pair of bushes and the bush groove.

3. The rotary compressor of claim 1, wherein the crowned portion is in a form of an arc in contact with the blade at the predetermined crowning start position.

4. The rotary compressor of claim 1, wherein the flat surface of each of the bushes lies in a plane orthogonal to a center line of the bush and parallel to an imaginary plane in contact with the curved surface of the bush.

5. The rotary compressor of claim 1, wherein the bush provided with the crowned portion at the edge thereof closer to the cylinder chamber is further provided with another crowned portion at an edge thereof closer to the back pressure space so as to be symmetrical about the center line of the bush as viewed in plan view.

* * * * *